United States Patent
Neuhaeuser

(10) Patent No.: US 12,477,326 B2
(45) Date of Patent: Nov. 18, 2025

(54) METHOD OF PROVIDING A COMMUNICATION FUNCTION IN A USER EQUIPMENT

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 301 days.

(21) Appl. No.: 17/801,553

(22) PCT Filed: Feb. 19, 2021

(86) PCT No.: PCT/EP2021/054189
§ 371 (c)(1),
(2) Date: Aug. 23, 2022

(87) PCT Pub. No.: WO2021/170506
PCT Pub. Date: Sep. 2, 2021

(65) Prior Publication Data
US 2023/0171593 A1    Jun. 1, 2023

(30) Foreign Application Priority Data
Feb. 24, 2020    (DE) ............ 10 2020 104 761.4

(51) Int. Cl.
*H04W 8/26* (2009.01)
*H04W 48/18* (2009.01)

(52) U.S. Cl.
CPC ......... *H04W 8/265* (2013.01); *H04W 48/18* (2013.01)

(58) Field of Classification Search
CPC ..... H04W 8/265; H04W 48/18; H04W 8/183; H04W 8/205
(Continued)

(56) References Cited

U.S. PATENT DOCUMENTS

2013/0226799 A1*  8/2013  Raj ................. G06Q 20/401
                                                              705/44
2017/0338962 A1   11/2017  Li et al.
(Continued)

FOREIGN PATENT DOCUMENTS

CN   109428717 A   3/2019
EP   3 065 431 A1  9/2016
(Continued)

OTHER PUBLICATIONS

International Search Report (PCT/ISA/210) issued in PCT Application No. PCT/EP2021/054189 dated May 14, 2021 (three (3) pages).
(Continued)

*Primary Examiner* — Rownak Islam
(74) *Attorney, Agent, or Firm* — Crowell & Moring LLP

(57) ABSTRACT

Methods, apparatuses, and computer-readable media are described to provide a communication function in a user equipment. A first request to implement a communication profile of a user in a user equipment (UE) is received at a management server. A second request from the management server requesting an activation of the communication profile based on the first request is received at a mobile network operator (MNO). An activation message enabling an implementation of the communication profile in the UE is received at the UE.

9 Claims, 4 Drawing Sheets

(58) Field of Classification Search
USPC .......................................................... 370/329
See application file for complete search history.

(56) References Cited

U.S. PATENT DOCUMENTS

2022/0247869 A1* 8/2022 Johnson ................ H04M 15/72
2022/0360994 A1* 11/2022 Ahmed ................. H04W 12/40

FOREIGN PATENT DOCUMENTS

| EP | 3 528 518 A1 | | 8/2019 | |
|----|----|----|----|----|
| GB | 2586231 A | * | 2/2021 | ............. A41D 1/002 |
| WO | WO 2018/129753 A1 | | 7/2018 | |
| WO | WO 2019/015793 A1 | | 1/2019 | |
| WO | WO 2019/113486 A1 | | 6/2019 | |
| WO | WO-2020205011 A1 | * | 10/2020 | |

OTHER PUBLICATIONS

English-language Written Opinion (PCT/ISA/237) issued in PCT Application No. PCT/EP2021/054189 dated May 14, 2021 (three (3) pages).
Chinese-language Chinese Office Action issued in Chinese Application No. 202180014820.4 dated Oct. 8, 2024, with English translation (16 pages).

\* cited by examiner

ABSTRACT
METHOD OF PROVIDING A COMMUNICATION FUNCTION IN A USER EQUIPMENT

FIELD

Examples of the present disclosure relate to a method of providing a communication function in a user equipment, a computer readable storage medium, a management server, and server of a mobile network operator. The examples of the present disclosure particularly relate to an implementation of communication profiles, such as eSIM profiles, in user equipment, and in vehicles.

BACKGROUND

Wireless communication systems are rapidly growing in usage. A user may have a variety of devices that should be equipped with communication capabilities. Such devices can be a smart phone, a tablet, a smart watch and a car. Due to certain limitations imposed by a mobile network operator, it may be difficult or even impossible to provide communication capabilities to all user devices.

In view of the above, a new method of providing a communication function in a user equipment, a computer readable storage medium, a management server, and server of a mobile network operator, that overcome at least some of the problems in the art are beneficial.

SUMMARY

In light of the above, a method of providing a communication function in a user equipment, a computer readable storage medium, a management server, and server of a mobile network operator are provided.

It is an object of the present disclosure to enable a communication function of a user equipment. Particularly, it is an object of the present disclosure to enable a communication function of a user equipment with reduced resources and/or energy consumption.

The objects are solved by the features of the independent claims. Preferred examples are defined in the dependent claims.

According to an independent aspect of the present disclosure, a method of providing a communication function in a user equipment is provided. The method includes receiving, at a management server, a first request to implement a communication profile of a user in a user equipment, UE.

According to an independent aspect of the present disclosure, a method of providing a communication function in a user equipment is provided. The method includes receiving, at a management server, a first request to implement a communication profile of a user in a user equipment, UE; receiving, at a mobile network operator, MNO, a second request from the management server requesting an activation of the communication profile based on the first request; and receiving, at the UE, an activation message enabling an implementation of the communication profile in the UE.

According to some examples, which can be combined with other examples described herein, the method further includes receiving, at the UE, an initiation message from the user, wherein the first request is based on the initiation message.

According to some examples, which can be combined with other examples described herein, the initiation message includes at least one of an MNO selection and/or a phone number of the user.

According to some examples, which can be combined with other examples described herein, the method further includes sending, from the management server to the MNO, a third request requesting a token from the MNO; and receiving, at the management server from the MNO, the token from the MNO.

According to some examples, which can be combined with other examples described herein, the method further includes receiving, at the management server from the MNO, an activation code.

According to some examples, which can be combined with other examples described herein, the method further includes generating, at the MNO, a SIM profile or CSMI profile for the user.

According to some examples, which can be combined with other examples described herein, the communication profile is an eSIM profile of the user.

The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, wherein a certain type of eSIM only works with a certain type of certificate.

The term "user equipment" includes computer devices which are mobile (e.g., vehicles) and/or portable (e.g., smartphones) and which are configured for wireless communication. Examples of UE devices include mobile telephones or smart phones, portable gaming devices, laptops, wearable devices (e.g., smart watches, smart glasses, smart shoes), PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication.

The term "vehicle" includes passenger cars, trucks, buses, campers, motorcycles, etc., which are used to transport people, goods, etc. In particular, the term includes motor vehicles for the transport of persons.

The term "mobile terminal" includes in particular smartphones, but also other mobile telephones or cell phones, personal digital assistants (PDAs), tablet PCs, smart watches, smart glasses, and all current and future electronic devices that are equipped with communication technology.

According to another independent aspect of the present disclosure, a computer readable storage medium is provided. The computer readable storage medium includes instructions which, when executed on one or more processors, cause the one or more processors to perform the method for an active call handover of the present disclosure.

The term "computer readable storage medium" includes various types of non-transitory memory devices or storage devices. The term "storage medium" is intended to include a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The storage medium may include other types of non-transitory memory as well or combinations thereof.

According to another independent aspect of the present disclosure, a management server, comprising one or more processors configured to: receive a first request to implement a communication profile of a user in a user equipment, UE; send, to a mobile network operator, MNO, a second request requesting an activation of the communication profile based on the first request; and send, to the UE, an activation message enabling an implementation of the communication profile in the UE.

Further aspects, benefits, and features of the present disclosure are apparent from the claims, the description, and the accompanying drawings.

Examples are also directed at devices for carrying out the disclosed methods and include device parts for performing each described method aspect. These method aspects may be performed by way of hardware components, a computer programmed by appropriate software, by any combination of the two or in any other manner. Furthermore, examples according to the present subject matter are also directed at methods for operating the described servers and user equipment. It includes method aspects for carrying out every function of the servers and user equipment.

BRIEF DESCRIPTION OF THE DRAWINGS

So that the manner in which the above recited features of the present disclosure can be understood in detail, a more particular description of the disclosure, briefly summarized above, may be had by reference to examples. The accompanying drawings relate to examples of the disclosure and are described as follows.

DETAILED DESCRIPTION OF THE DRAWINGS

Reference will now be made in detail to the various examples of the disclosure, one or more examples of which are illustrated in the figures. Within the following description of the drawings, the same reference numbers refer to same components. Generally, only the differences with respect to individual examples are described. Each example is provided by way of explanation of the disclosure and is not meant as a limitation of the disclosure. Further, features illustrated or described as part of one example can be used on or in conjunction with other examples to yield yet a further example. It is intended that the description includes such modifications and variations.

Although the examples of the present disclosure are described with reference to a vehicle, it is to be understood that the present disclosure is not limited thereto and that the examples described herein may be implemented in and/or used with a number of different types of UE devices, including but not limited to cellular phones, tablet computers, wearable computing devices, portable media players, vehicles, and any of various other computing devices.

Figure 1:
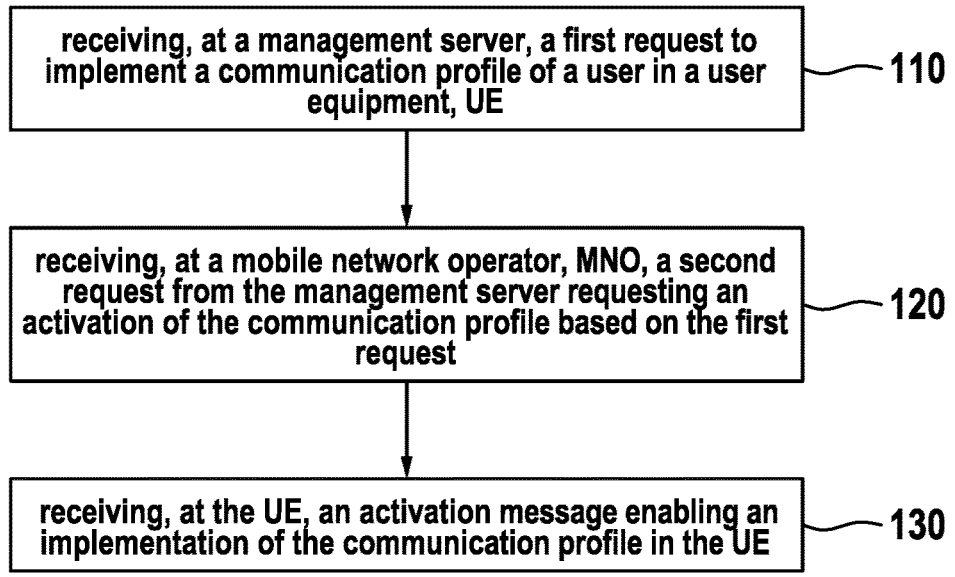
FIG. 1 shows a flow chart of providing a communication function in a user equipment according to the present subject matter.

FIG. 1 shows a flow chart of method 100 of providing a communication function in a user equipment according to examples described herein.

The method 100 includes in block 110 receiving, at a management server, a first request to implement a communication profile of a user in a user equipment, UE; in block 120 receiving, at a mobile network operator, MNO, a second request from the management server requesting an activation of the communication profile based on the first request; and in block 130 receiving, at the UE, an activation message enabling an implementation of the communication profile in the UE.

The MNO may also be referred to as a wireless service provider, wireless carrier, cellular company, or mobile network carrier, and is a provider of wireless communications services that owns or controls all the elements necessary to sell and deliver services to a user. In particular, the MNO owns or controls the elements of the network infrastructure necessary to provide services to subscribers (users) over a licensed spectrum.

The UEs and the MNO communicate via a transmission medium (see reference numeral "1" in FIG. 2), such as a network. In a preferred example, the network is a mobile network managed by the MNO. The transmission medium may use any of various wireless communication technologies, or telecommunication standards, such as GSM, UMTS, LTE, LTE-Advanced (LTE-A), 5G, HSPA, and the like. A communication via future telecommunication standards is possible.

Figure 2:
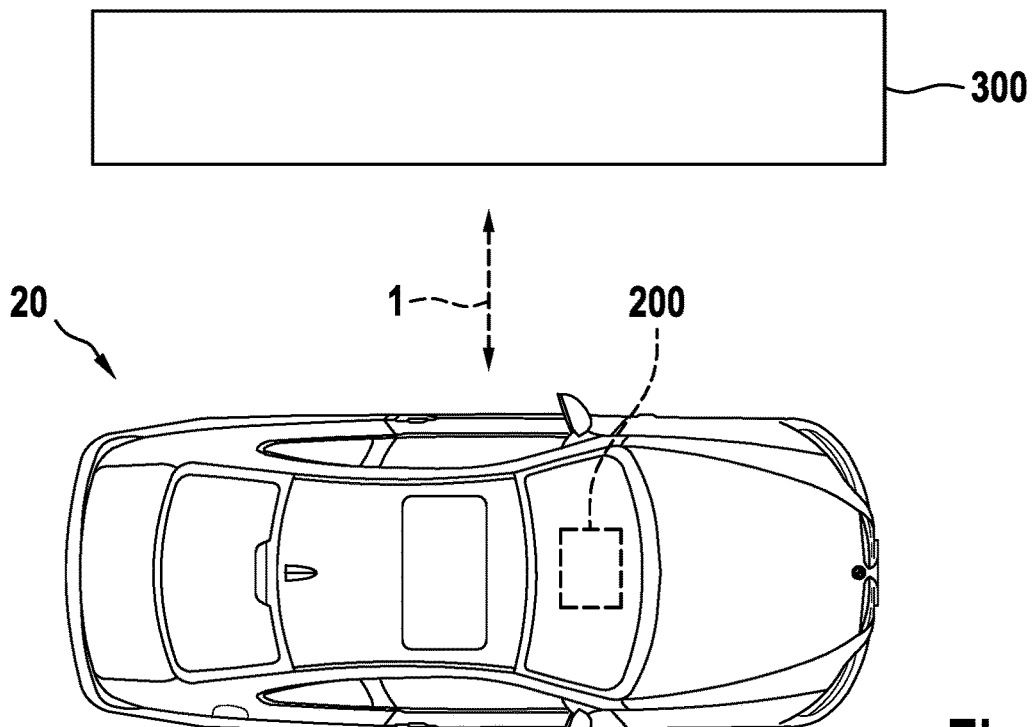
FIG. 2 shows a schematic view of a vehicle and a management server according to the present subject matter.

FIG. 2 shows a schematic view of a vehicle 20 and a management server 300 according to examples described herein.

In the example shown in FIG. 2, the UE is a vehicle 20 or a communication module 200 of the vehicle 20. However, the present disclosure is not limited thereto and the examples may be implemented in and/or used with a number of different types of UE devices, including, but not limited to, cellular phones, tablet computers, wearable computing devices, portable media players, and any of various other computing devices.

Figure 3:
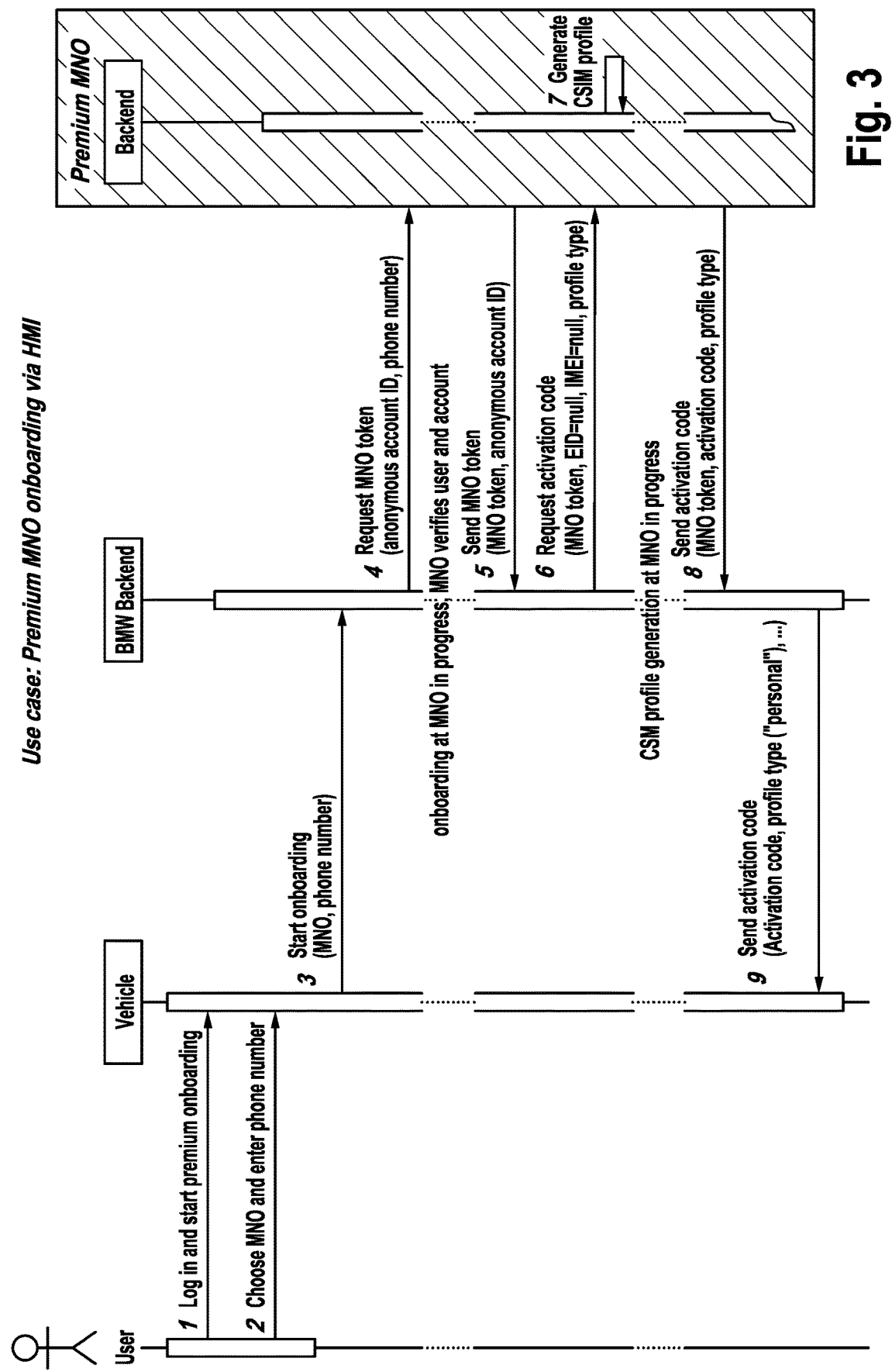
FIG. 3 shows a messaging process for providing a communication function in a user equipment according to the present subject matter.

FIG. 3 shows a messaging process for providing a communication function in a user equipment according to examples described herein.

In some implementations, the method 100 further includes receiving, at the UE, an initiation message from the user, wherein the first request is based on the initiation message. For example, the user may initiate the process by logging into an account, e.g., in the UE, which may be a vehicle. The user can select a specific MNO during the login and/or enter his/her phone number. Based thereon, the UE may generate the first request which is then sent to the management server. The first request may include the selected MNO and/or the phone number entered by the user.

In some examples, the method 100 further includes sending, from the management server to the MNO, a third request requesting a token from the MNO; and receiving, at the management server from the MNO, a token message from the MNO.

The third request may include an anonymous account ID and the phone number. Thereby, there is no need to expose an identity of the user (e.g., to the management server) because the identity is mapped to an anonymous profile. Only the MNO knows the identity of the user.

The token message, which is sent from the MNO to the management server, may include an MNO token and/or an anonymous account ID, Further, the second request, which is sent from the management server requesting an activation of the communication profile may include the MNO token.

According to some examples, which can be combined with other examples described herein, the method 100 further includes generating, at the MNO, a SIM profile or CSMI profile for the user.

Finally, the MNO sends the activation message enabling an implementation of the communication profile in the UE to the UE. The activation message may include the activation code, and may optionally include a profile type (e.g., personal etc.) based on the SIM profile or CSMI profile for the user In some implementations, the communication profile is an eSIM profile of the user. The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, wherein a certain type of eSIM only works with a certain type of certificate.

As explained above, the method 100 includes sending, from the management server to the MNO, a third request requesting a token from the MNO. The third request may be structured as follows:

Request
HTTP Headers:

| Name | Description | Schema | Required | Example |
|---|---|---|---|---|
| Request-id | UUID identifying a request. | String, ([A-Za-z0-9]) | Yes | 41cbc1e2-338f-11e6-ac61-9e71128cae77 |
| x-api-key | Used by MNO to authenticate THE MANAGMENT SERVER. | String, ([A-Za-z0-9]) | Yes | 1234abcdefghij0123456789 |

Request Body:

| Name | Description | Schema | Required | Example |
|---|---|---|---|---|
| source | Source from which the onboarding process was initiated by the user. If the user started onboarding in vhecile, the request must contain the phone number (phoneNumber). If the user started onboarding at MNO or the management server touchpoint except the vehicle, the request contains no phone number. | String, ("vehicle"\|"mno"\|"the management server") | Yes | "vehicle" |
| phoneNumber | The MSISDN associated with the user's MNO account. If the user started onboarding in vhecile, the request must contain the phone number (phoneNumber). If the user started onboarding at MNO touchpoint, the request contains no phone number. | String | Yes, unless error is set. | Format of unencrypted phone number: CC + NPA + SN CC = Country Code (No leading "+"_s_i_g_n_)_ _ NPA = Number Planning Area SN = Subscriber Number Examples: 919961345678 4918974020143 Following content must be sent encrypt_function(CC + NPA + SN) |
| account_id | Identify for the user (i.e. unique value linked to the GC-ID). For onboarding start at vehicle or the management server touchpoint e.g., App or portal, the accountID is generated by the management server. For onboarding start at MNO, the accountID is generated by MNO. | String, ([A-Za-z0-9]) or UUID | Yes | 68e656b251e67e8358bef8 483ab0d51c6619f3e7ala9f 0e75838d41ff368f728 Maximum length is 64 characters. |

The response (token message) may be configured as follows:

Response
HTTP Status Code:

| HTTP-Code | Description |
|---|---|
| 200 | Success. MNO token is included in response body. |
| 201 | The federated_id has been created and assigned to the appropriate user. |
| 401 | Unauthorized |
| 403 | The client does not have the necessary permissions to add an MNO token to the user. |
| 404 | The user identified by account_id could not be found. |
| 408 | Service Failure, Phone number is not valid. |
| 422 | Federated_id format is incorrect, or the id is duplicate or the account_id is invalid. |
| 500 | Internal Server Error |

Response Body (Optional):

| Name | Description | Schema | Required | Example |
|---|---|---|---|---|
| federated_id | Federated UUID generated by the MNO to be used by both the MNO and the management server to refer to the user. Referred to as MNO token in this document. | uuid | Yes, if status code is 200. | 25bca1e2-338f-11d6-ac61-9e71138fd521 The federate_id is created by the MNO. The federate_id must be created in a way that it is unique for a customer for a given MNO. This means, if the management server sends for example an activation code request to the MNO, there must not be any ambiguity at the MNO. |
| phoneNumber | The MSISDN associated with the user's subscription. This must be the number which is known to the customer (not a pure technical number), because this number will be used at the management server's touchpoints to show the customer which subscriptions are added to the customer's account. | String, ([0-9]) | Yes, unless error is set. | Format of unencrypted phone number: CC + NPA + SN CC = Country Code (No leading "+" _s_i_g_n )_ _ NPA = Number Planning Area SN = Subscriber Number Examples: 919961345678 4918974020143 Following content must be sent encrypt_function (CC + NPA + SN) |
| subscriptionType | Indicates whether the MNO token is linked to a private mobile subscription or business mobile subscription. This information will by shown to the customer at a the management server touchpoint so the customer can easily identify private and business subscriptions | String ("private"\|"business"\|"unknown") | Yes, unless error is set. | private |

When the management server uses "Request MNO token", the MNO has two options on how to respond:
1. Synchronous response mode:
Successful response (MNO token generated/available):
   The MNO uses status code 200 in "Request MNO token" response and includes the MNO token in the response body as described above.
Unsuccessful response (MNO token cannot be generated):
   The MNO uses a 4xx status code and includes an error description in the response body.
   The synchronous response mode is only allowed, if the MNO token is already available at the MNO's system and can be returned within 3 seconds. This means especially, that no more user interaction is necessary. If any user interaction is necessary, the asynchronous response mode must be used.
2. Asynchronous response mode:
Successful response:
   The MNO uses status code 201 indicating that the management servers' request will be processed. When the MNO token is available, the MNO uses thee server's API "Send MNO token" to deliver the MNO token to THE MANAGMENT SERVER.
Unsuccessful response:
   The MNO uses status code 201 indicating that the management servers' request will be processed. If an error occurs during processing, the MNO uses the management servers' API "Send MNO token" to deliver the error description to the management server.

Figure 4:
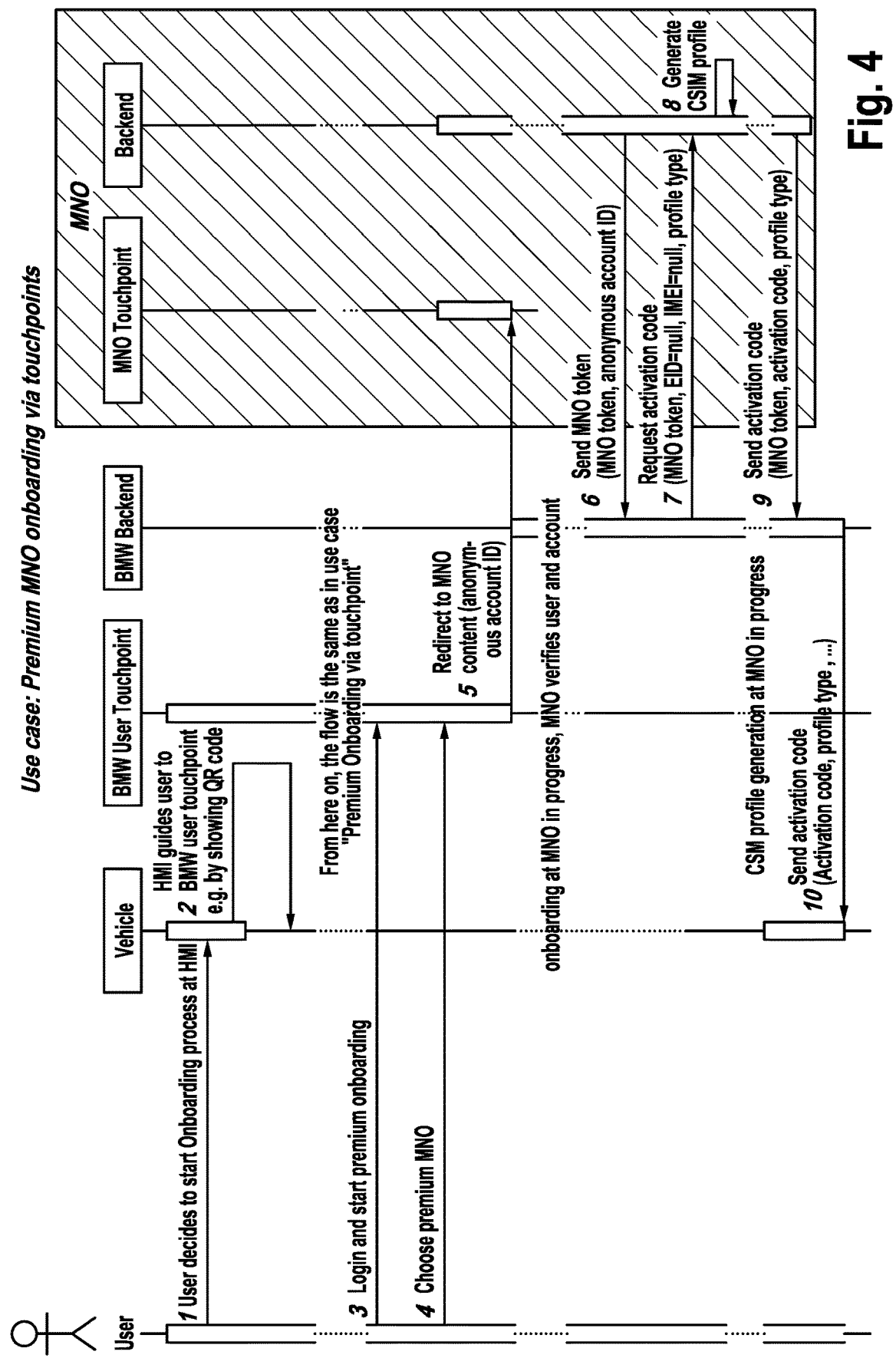
FIG. 4 shows a messaging process for providing a communication function in a user equipment according to the present subject matter.

FIG. 4 shows a messaging process for providing a communication function in a user equipment according to further examples described herein.

The above use case "premium onboarding of FIG. 3, can be modified for three reasons:

In the previous version, there were customer notifications via Email/SMS/etc. involved. These notifications are considered as not reliable with a high risk of losing the customer during this notification step. The new process does not include this notification process.

In the previous version, the customer needed to enter his/her phone number e.g., at the HMI. There is a risk that the customer enters the wrong phone number (typing error) and the process would fail. In the new process, no phone number needs to be entered by the customer.

In the previous version, there was a risk that by mistake, the MNO token gets assigned to the wrong user if user A is logged in at the vehicle and user B enters his/her phone number. In the current version, this is avoided because no phone number needs to be entered at the vehicle HMI.

Summary of the adapted vehicle onboarding flow:
In the vehicle, the customer decides to start the onboarding process.
The HMI guides the customer to the management server touchpoint, e.g., by showing a QR code which opens the management server app or the management server web portal.
From this step on, the process is identical as the use case "Premium Onboarding via touchpoint (e.g., App)".

Interfaces to MNO
The following defines the REST interfaces which are provided by the MNOs.
Request Activation Code
POST/activation-code-requests/{federated_id}
The management server calls this interface to make an activation code request on a user's behalf, or to request default profiles for carsharing vehicles.
Request
HTTP Headers:

| Name | Description | Schema | Required | Example |
| --- | --- | --- | --- | --- |
| management server-request-id | UUID identifying a request. | String, ([A-Za-z0-9]) | Yes | 14abcle2-338f-11e6-ac61-9e71128cae77 |
| x-api-key | Used by MNO to authenticate a. | String, ([A-Za-z0-9]) | Yes | 1234abcdefghij0123456789 |

Path Parameters:

| Name | Description | Schema | Required | Example |
| --- | --- | --- | --- | --- |
| federated_id | Federated UUID generated by the MNO to be used by both the MNO and THE MANAGMENT SERVER to refer to the user. Referred to as MNO token in this document. | uuid | Yes | 14abcle2-338f-11e6-ac61-9e71128cae77 |

| Name | Description | Schema | Required | Example |
| --- | --- | --- | --- | --- |
| profileType | The type of the profile, i.e. "default" in case of a default profile which can be assigned to different users (e.g., for the carsharing use case) or "personal" in case of a personal profile which is assigned to a specific user. | String ("default"\|"personal") | Yes | default |

-continued

| Name | Description | Schema | Required | Example |
|---|---|---|---|---|
| deviceType | A type identifier for the eSIM device in the vehicle. | String ("the management server") | Yes | the management server |
| imei | International Mobile Equipment Identity. This parameter will be empty but present for compatibility reasons. | String [0-9]{2}-[0-9]{6}-[0-9]{6}-[0-9]{2}), or emtpy String | No | |
| eid | Embedded Integrated Circuit Card ID. This parameter will be empty but present for compatibility reasons. | String, ([A-Za-z0-9]), or emtpy String | No | |
| activationCodeRequestID | A UUID identifying the request for a new activation code. | uuid | Yes | 14abc1e2-338f-11e6-ac61-9e71128cae77 |
| replaceIccid | Integrated Circuit Card ID, unique profile identifier. The profile which belongs to this iccid is the replace candidate, when all eSIM profile slots of the customers are already used. | 20-22 digits | No | 98341201501601380129 |

Response
HTTP Status Code:

| HTTP-Code | Description |
|---|---|
| 200 | Success. Activation code is included in response body. |
| 201 | The request has been stored and will be processed. |
| 401 | Unauthorized |
| 404 | The user identified by the federated ID or the request could not be found. |
| 422 | No activation code can be created |
| 500 | Internal Server Error |

Response Body (Optional):

| Name | Description | Schema | Required | Example |
|---|---|---|---|---|
| activationCode | The activation code which is used to download an eSIM profile from the SM-DP+ server | String, max. length 255 characters, ([A-Za-z0-9$.]) | Yes, if status code is 200 | 1$SMDP.GSMA.COM$04386-AGYFT-A74Y8-3F815 |
| profileType | The type of the profile, i.e. "default" in case of a default profile which can be assigned to different users (e.g., for the carsharing use case) or "personal" in case of a personal profile which is assigned to a specific user. | String ("default"\|"personal") | Yes, if status code is 200 | personal |
| profileReplaced | Indicates if the MNO deleted the profile which was specified by the management server from an eSIM slot of the customer in order to create the new requested profile. true: Means that the MNO replaced | String ("true"\|"false") | Yes, if THE MANAGMENT SERVER sends a "re-placeIccid" in Request activation code request body. Otherwise: No | true |

| Name | Description | Schema | Required | Example |
|---|---|---|---|---|
| | the profile which was specified by the management server with the new profile to which the new requested activation code belongs. false: The iccid which was sent from the management server was ignored and a new activation code was created without removing an existing profile. | | | |

When the management server uses "Request activation code", the MNO has two options on how to respond:
1. Synchronous response mode:
Successful response (activation code generated/available):
  The MNO uses status code 200 in "Request activation code" response and includes the activation code and profile type in the response body as described above.
Unsuccessful response (activation code cannot be generated):
  The MNO uses a 4xx status code and includes an error description in response body (as described in error handling).
  The synchronous response mode is only allowed, if the activation code is already available at the MNO's system and can be returned within 3 seconds. This means especially, that no more user interaction is necessary. If any user interaction is necessary, the asynchronous response mode must be used.
2. Synchronous response mode:
Successful response:
  The MNO uses status code 201 indicating that the management server's request will be processed.

When the activation code is available, the MNO uses the management server's API "Send activation code" to deliver the activation code to the management server.
Unsuccessful response:
  The MNO uses status code 201 indicating that the management server's request will be processed. If an error occurs during processing, the MNO uses the management server's API "Send activation code" to deliver the error description to the management server.

Send MNO Token
POST/cesim/mno/v1/users/{account_id}
  This interface is called by the MNO to submit an MNO token to the management server. After having received the user's credentials along with some value that the management server can use to identify the user as the management server customer, the MNO first checks if the credentials are correct. If they are, it generates a UUID that shall be used as a federated identity ("MNO token") between the MNO and the management server.
Request
HTTP Headers:

| Name | Description | Schema | Required | Example |
|---|---|---|---|---|
| the management server-request-id | UUID identifying a request. | String, ([A-Za-z0-9]) | Yes | 14abcle2-338f-11e6-ac61-9e71128cae77 |
| x-api-key | Used by service to decide which resources and procedures the client may access. | String, ([A-Za-z0-9]) | Yes | 1234abcdefghij0123456789 |

Path Parameters:

| Name | Description | Schema | Required | Example |
|---|---|---|---|---|
| account_id | Identifier generated by the management server to identify the user (i.e. unique value linked to the GC-ID) In case of onboarding start at MNO touchpoint, the account_id is created | String, ([A-Za-z0-9]) | Yes | 68e656b251e67e8358bef84 83ab0d51c6619f3e7a1a9f0e 75838d41ff368f728 Maximum length is 64 characters. |

-continued

| Name | Description | Schema | Required | Example |
|---|---|---|---|---|
| | by the MNO. See flow chart for onboarding with start at MNO touchpoint | | | |

Request Body:

| Name | Description | Schema | Required | Example |
|---|---|---|---|---|
| federated_id | Federated UUID generated by the MNO to be used by both the MNO and the management server to refer to the user. Referred to as MNO token in this document. | uuid | Yes, unless error is set. | 25bca1e2-338f-11d6-ac61-9e71138fd521 The federate_id is created by the MNO. The federate_id must be created in a way that it is unique for a customer for a given MNO. This means, if the management server sends for example an activation code request to the MNO, there must not be any ambiguity at the MNO. |
| phoneNumber | The MSISDN associated with the user's subscription. This must be the number which is known to the customer (not a pure technical number), because this number will be used at the management server's touchpoints to show the customer which subscriptions are added to the customer's account. | String, ([0-9]) | Yes, unless error is set. | 919961345678 |
| subscriptionType | Indicates whether the mno token is linked to a private mobile subscription or business mobile subscription. This information will be shown to the customer at the management server touchpoint so the customer can easily identify private and business subscriptions | String ("private"\|"business"\|"unknown") | Yes, unless error is set. | private |
| isUpdate | Indicates, if the massage is sent to update information. Only following information can be updated: "phoneNumber", "subscriptionType". | String ("true"\|"false") | Yes, if message is sent to update information. Otherwise, no. | true |
| error | Not set, or error describing why the federated id cannot be generated See error handling table "Error codes provided from MNO" below. | String | Yes, unless federated_id is set | 1000: Customer not eligible Maximum length is 512 characters. |

Response:
HTTP Status Code:

| HTTP-Code | Description |
|---|---|
| 201 | The federated id has been created and assigned to the appropriate user. |
| 401 | Unauthorized |

-continued

| HTTP-Code | Description |
|---|---|
| 403 | The client does not have the necessary permissions to add an MNO token to the user. |
| 404 | The user identified by account_id could not be found. |

-continued

| HTTP-Code | Description |
|---|---|
| 422 | Federated ID format is incorrect or the id is duplicate. |
| 500 | Internal Server Error |

The "phoneNumber" and "subscriptionType" will be used to display this information to the customer, so the customer can differ between several subscriptions, if the customer has onboarded multiple subscriptions, e.g., a private and a business contract. When the "phoneNumber" or "subscriptionType" change, the "Send MNO token" can be send again with "isUpdate" set to "true". Only "phoneNumber" and "subscriptionType" can be updated, the "federated_id" cannot be updated.

Send Activation Code

POST/cesim/mno/v1/activation-codes/{federated_id}

This interface is called by the MNO to submit an activation code to the management server. After the MNO has received a request for and generated an activation code, it submits the activation code to the management server backend for further processing (i.e. storage and forwarding to the vehicle).

Request HTTP Headers:

| Name | Description | Schema | Required | Example |
|---|---|---|---|---|
| the management-server-request-id | UUID identifying a request. | String, ([A-Za-z0-9]) | Yes | 14abc1e2-338f-11e6-ac61-9e71128cae77 |
| x-api-key | Used by service to decide which resources and procedures the client may access. | String, ([A-Za-z0-9]) | Yes | 1234abcdefghij0123456789 |

Path Parameters:

| Name | Description | Schema | Required | Example |
|---|---|---|---|---|
| federated_id | Federated ID between MNO and the management server. Referred to as MNO token in this document. | uuid | Yes | 14abc1e2-338f-11e6-ac61-9e71128cae77 |

| Name | Description | Schema | Required | Example |
|---|---|---|---|---|
| activationCode | The activation code which is used to download an eSIM profile from the SM-DP+ server | String, max. length 255 characters, ([A-Za-z0-9$.]) | unless Yes, unless error is set | 1$SMDP.GSMA.COM$04386-AGYFT-A74Y8-3F815 |
| profileType | The type of the profile, i.e. "default" in case of a default profile which can be assigned to different users (e.g., for the carsharing use case) or "personal" in case of a personal profile which is assigned to a specific user. | String ("default"\| "personal") | Yes, unless error is set | personal |
| error | Not set, or error describing why the activation code cannot be generated See error handling table "Error codes provided from MNO" below. | String | Yes, unless activation code is set | 1000: Customer not eligible Maximum length is 512 characters. |
| activationCodeRequestID | UUID previously generated by the management server when requesting a new activation code | uuid | Yes | 14abc1e2-338f-11e6-ac61-9e71128cae77 |
| profileReplaced | Indicates if the MNO deleted the profile which was specified by the management server | String ("true"\| "false") | Yes, if the management server sends a "re- | true |

| Name | Description | Schema | Required | Example |
|---|---|---|---|---|
| | from an eSIM slot of the customer in order to create the new requested profile. true: Means that the MNO replaced the profile which was specified by the management server with the new profile to which the new requested activation code belongs. false: The iccid which was sent from the management server was ignored and a new activation code was created without removing an existing profile. | | placeIccid" in Request activation code request body. Otherwise: No | |

Response:
HTTP Status Code:

| HTTP-Code | Description |
|---|---|
| 200 | The activation code has been assigned to the appropriate user. |
| 401 | Unauthorized |
| 404 | The user identified by the federated ID or the activation code request could not be found. |
| 422 | The activation code has an invalid format (e.g., no SMDP+ URI or no matching ID) |
| 422 | The profile type is not supported for this request |
| 422 | The activationCodeRequestID could not be matched |
| 500 | Internal Server Error |

In the following, another example of the present disclosure is described in detail. The following example can be combined with the other examples described herein.

1. Interface Documentation

| API | Description | Endpoints API name | URL | Consumers |
|---|---|---|---|---|
| MNO | Interface provided by the management server to contact MNOs | Send MNO token | POST /cesim/mno/v1/users/{account_id} | MNOs |
| | | Send activation code | POST /cesim/mno/v1/activation-codes/{federated_id} | MNOs |
| | | Notify MNO token invalid | POST /cesim/mno/v1/users/{federated_id}/invalidate | MNOs |
| | | Send profile information | POST /cesim/mno/v1/users/{federated_id}/profiles | MNOs |
| MNO-side interfaces | Interfaces provided by MNOs and called by the management server. | Request activation code | POST /activation-code-requests/{federated_id} | CESIM |
| | | Send CSIM status | POST /statuses/{federated_id} | CESIM |
| | | Request invalidate MNO token | DELETE /users/{federated_id} | CESIM |
| | | Service health check | GET /healthcheck | CESIM |

1.1 CESIM MNO API V1

These functions are called by the MNO during the various processes where a data exchange with the management server backend is required.

Send MNO Token

POST/cesim/mno/v1/users/{account_id}

This interface is called by the MNO to submit an MNO token to the management server. Additionally, this interface can be used to update some of the customer's information (phone number, subscription type or customer group). The MNO token itself cannot be updated.

Request

HTTP Headers:

| Name | Description | Schema | Required | Example |
| --- | --- | --- | --- | --- |
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by service to decide which resources and procedures the client may access. | String, ([A-Za-z0-9]) | Yes | 1234abcdefghij0123456789 |
| X-rgw-applicationid | This parameter identifies the MNO at the management server. The value is provided by the management server to the MNO. The value is constant for each request. | String, ([A-Za-z0-9]) | Yes | dk3kdwkef1 |

Path Parameters:

| Name | Description | Schema | Required | Example |
| --- | --- | --- | --- | --- |
| account_id | Identifier generated by the management server to identify the user (i.e. unique value linked to the GC-ID) | String, ([A-Za-z0-9._-]1) | Yes | eyJhbGciOiJIUzI1NiIsInR5cCI6IkpXVCJ9.eyJleHAiOiIxNTgwNzI0MDAwIiwidmVyIjoiNzg5Iiwic2lkIjoiYTYyNTIxMWEtMmNiYS00MTM2LWFhOGItMzRjMzkwYjhN2Q3Iiwi aWF0IjoxNTgwNzIwNDAwfQ.ZbD3EEYryEp4yub_8Ca_PYi22TatV2N3TBuf2nNy5Bs |

Request body:

| Name | Description | Schema | Required | Example |
| --- | --- | --- | --- | --- |
| federated_id | Federated ID generated by the MNO to be used by both the MNO and the management server to refer to the user. Referred to as MNO token in this document. | uuid | Yes, unless error is set. | 25bca1e2-338f-11d6-ac61-9e71138fd521 The federated_id is created by the MNO. The federated_id must be created in a way that it is unique for a customer for a given MNO. This means, if the management server sends for example an activation code request to the MNO, there must not be any ambiguity at the MNO. |
| phoneNumber | The MSISDN associated with the user's subscription. This must be the number which is | String | Yes, unless error is set. | Format of unencrypted phone number: CC + NPA + SN CC = Country Code (No leading "+" |

-continued

| Name | Description | Schema | Required | Example |
|---|---|---|---|---|
| | known to the customer (not a pure technical number), because this number will be used at the management server's touchpoints to show the customer which subscriptions are added to the customer's account. The phone number must be sent encrypted (see below). | | | sign) NPA = Number Planning Area SN = Subscriber Number Examples: 919961345678 4918974020143 Following content must be sent encrypt_function(CC + NPA + SN) encrypt_function will be described in the interface contract. |
| subscriptionType | Indicates whether the MNO token is mobile subscription or business mobile subscription. This information will be shown to the customer at a the management server touchpoint so the customer can easily identify private and business subscriptions | String ("private"\|"business"\|"unknown") | Yes, unless error is set. | private |
| isUpdate | Indicates, if the massage is sent to update information. Only following information can be updated: "phoneNumber", "subscriptionType, "customerGroup" | String ("true"\|"false") | Yes, if message is sent to update information. Otherwise, no. | true |
| error | Not set, or error describing why the federated_id cannot be generated See error handling table "Error codes provided from MNO" below. | String | Yes, unless federated_id is set | 1000: Customer not eligible Maximum length is 512 characters. |
| customerGroup | An optional identifier which can be used to group customers. This field is intended for reporting use cases. The value for this field is agreed between MNO and the management server in interface contract if required. | String | No. Do not set together with "error". | Market_Germany |

Phone Number Encryption:

For security reasons, the phoneNumber must not be sent as plain text in the field "phoneNumber", but must be encrypted. This is additional to the TLS encryption of the message itself, meaning, the message must be encrypted using TLS and additionally, the phone number must be encrypted in the field "phoneNumber".

Details on Encryption:

The phoneNumber will be encrypted in MNO backend. The details about the type of encryption and algorithm will be included in the interface contract. Note: The encryption mechanism/algorithm will be different than the activation code encryption. Reason: The activation code encryption will be end to end between MNO and vehicle. However, the phone number can be decrypted in the management server backend, for example for support use cases.

Response:

HTTP Status Code:

| HTTP-Code | Description |
| --- | --- |
| 201 | The federated_id has been created and assigned to the appropriate user. |
| 401 | Unauthorized |
| 403 | The client does not have the necessary permissions to add an MNO token to the user. |

-continued

| HTTP-Code | Description |
| --- | --- |
| 404 | The user identified by account_id could not be found. |
| 422 | Federated_id format is incorrect, or the id is duplicate or the account_id is invalid. |
| 500 | Internal Server Error |

The "phoneNumber" and "subscriptionType" will be used to display these informations to the customer, so the customer can differentiate between several subscriptions, if the customer has onboarded multiple subscriptions, e.g., a private and a business contract. When the "phoneNumber", "subscriptionType" or "customerGroup" change, the "Send MNO token" can be sent again with "isUpdate" set to "true". Only "phoneNumber", "subscriptionType" and "customerGroup" can be updated, the "federated_id" CANNOT be updated.

When sending a new MNO token from MNO to the management server (isUpdate=false), the management server will check if the account_id is valid. Only if the account_id is valid, the management server will accept the MNO token. Otherwise, the management server will return HTTP status 422 and reject the token.

For sending an update of "phoneNumber", "subscriptionType" or "customerGroup" (isUpdate 32 true), the account_id can be used even if it is expired.

Send Activation Code

POST/cesim/mno/v1/activation-codes/{federated_id}

This interface is called by the MNO to submit an activation code to the management server. After the MNO has received a request for and generated an activation code, it submits the activation code to the management server backend for further processing (i.e. storage and forwarding to the vehicle).

Request

HTTP Headers:

| Name | Description | Schema | Required | Example |
| --- | --- | --- | --- | --- |
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by service to decide which resources and procedures the client may access. | String, ([A-Za-z0-9]) | Yes | 1234abcdefghij0123456789 |
| X-rgw-applicationid | This parameter identifies the MNO at the management server. The value is provided by the management server to the MNO. The value is constant for each request. | String, ([A-Za-z0-9]) | Yes | dk3kdwkefl |

Path Parameters:

| Name | Description | Schema | Required | Example |
| --- | --- | --- | --- | --- |
| federated_id | Federated ID between MNO and the management server. Referred to as MNO token in this document. | uuid | Yes | 14abc1e2-338f-11e6-ac61-9e71128cae77 |

Request Body:

| Name | Description | Schema | Required | Example |
| --- | --- | --- | --- | --- |
| activationCode | The activation code which is used to download an eSIM profile from the SM-DP+ server. The activation code must be encrypted. See details below table. | String | Yes, unless error is set | q/XJojvcQksFdUUbk 9sqiDJ9+KR0etRSPn Vt4BnTQ4/9jG0UvX+ epLLCfrO07Dwn |
| profileType | The type of the profile. Currently, there is only the profile type "personal" | String ("personal") | unless Yes, error is set | personal |
| error | Not set, or error describing why the activation code cannot be generated See error handling table "Error codes provided from MNO" below. | String | Yes, unless activation code is set | 1000: Customer not eligible Maximum length is 512 characters. |
| activationCodeRequestID | UUID previously generated by the management server when requesting a new activation code | uuid | Yes | 14abc1e2-338f-11e6-ac61-9e71128cae77 |
| profileReplaced | Indicates if the MNO deleted the profile which was specified by the management server from an eSIM slot of the customer in order to create the new requested profile. true: Means that the MNO replaced the profile which was specified by the management server with the new profile to which the new requested activation code belongs. false: The iccid which was sent from the management server was ignored and a new activation code was created without removing an existing profile. | String ("true"|"false") | Yes, if the management server sends a "re-placeIccid" in Request activation code request body. Otherwise: No | true |

Activation Code Encryption:

For security reasons, the activation code must not be sent as plain text in the field "activationCode", but must be encrypted. This is additional to the TLS encryption of the message itself, meaning, the message must be encrypted using TLS and additionally, the activation code must be encrypted in the field "activationCode".

Details on Encryption:

The activation codes shall be encrypted end to end between MNO and the vehicle to protect the user. The activation code will be encrypted in MNO backend and decrypted in the vehicle. The details about the type of encryption and algorithm will be included in the interface contract.

Generic Example

The activation code

1$CV-1000-MY-ESIM.COM$DEF40A57E6CEFD34FA64B4A38D9681A5 after encryption and Base64 encoding is:

K+gntTX91B40088 Km+fraIYJHoPXK9yOAtJWebk+VGq+ShFHBEx+BUeWC2CzWPox ba806OF1kNZvTcaylhYORA==

This encrypted activation code must then be sent in the field "activationCode".

Response:
HTTP Status Code:

| HTTP-Code | Description |
|---|---|
| 200 | The activation code has been assigned to the appropriate user. |
| 401 | Unauthorized |
| 404 | The user identified by the federated_id or the activation code request could not be found. |
| 422 | The activation code has an invalid format (e.g., no SMDP+ URI or no matching ID) |
| 422 | The profile type is not supported for this request |
| 422 | The activationCodeRequestID could not be matched |
| 500 | Internal Server Error |

Notify MNO Token Invalid
POST/cesim/mno/v1/users/{federated_id}/invalidate

This interface is called by the MNO to notify the management server that the user's subscription has ended or the user chose to delete the link between the management server account and MNO account. The MNO token cannot be used to request any new activation codes any longer and all profiles of the user will be deleted as a consequence.

Request
HTTP Headers:

| Name | Description | Schema | Required | Example |
|---|---|---|---|---|
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by service to decide which resources and procedures the client may access. | String, ([A-Za-z0-9]) | Yes | 1234abcdefghij0123456789 |
| X-rgw-applicationid | This parameter identifies the MNO at the management server. The value is provided by the management server to the MNO. The value is constant for each request. | String, ([A-Za-z0-9]) | Yes | dk3kdwkef1 |

Path Parameters:

| Name | Description | Schema | Required | Example |
|---|---|---|---|---|
| federated_id | Federated ID between MNO and the management server. Referred to as MNO token in this document. | uuid | Yes | 14abc1e2-338f-11e6-ac61-9e71128cae77 |

Request Body:

| Name | Description | Schema | Required | Example |
|---|---|---|---|---|
| reason | An optional short description why the MNO token is invalid. The reason is logged for support purposes in case customer contacts customer care. | String, ([A-Za-z0-9]) | No | user subscription ended |

Response:
HTTP Status Code:

| HTTP-Code | Description |
|---|---|
| 204 | The federated_id has been invalidated |
| 401 | Unauthorized |
| 404 | The user identified by the federated_id cannot be found |
| 500 | Internal Server Error |

Send Profile Information
POST/cesim/mno/v1/users/{federated_id}/profiles

This interface is called by the MNO to send information which are relevant for one specific profile or a list of specified profiles, which all belong to the same customer and same subscription (MNO token).

Request
HTTP Headers:

| Name | Description | Schema | Required | Example |
|---|---|---|---|---|
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by service to decide which resources and procedures the client may access. | String, ([A-Za-z0-9]) | Yes | 1234abcdefghij0123456789 |
| X-rgw-applicationid | This parameter identifies the MNO at the management server. The value is provided by the management server to the MNO. The value is constant for each request. | String, ([A-Za-z0-9]) | Yes | dk3kdwkef1 |

Path Parameters:

| Name | Description | Schema | Required | Example |
|---|---|---|---|---|
| federated_id | Federated ID between MNO and the management server. Referred to as MNO token in this document. | uuid | Yes | 14abc1e2-338f-11e6-ac61-9e71128cae77 |

Request Body:

| Name | Description | Schema | Required | Example |
|---|---|---|---|---|
| profiles | The list of affected ICCIDs of the customer. | String array | Yes | {<br>"profiles"<br>[„8944500805172032953",<br>„8944500805172032953"],<br>...<br>} |
| status | The new status of the profiles. | String ("invalid"\|"valid"\|"suspended") | Yes | invalid |
| reason | An optional short description why the profile(s) information was sent. The reason is logged for support purposes in case customer contacts customer care. | String, ([A-Za-z0-9]) | No | profile defect |

Response:
HTTP Status Code:

| HTTP-Code | Description |
|---|---|
| 200 | The profile information has been updated successfully. |
| 401 | Unauthorized |
| 403 | The client does not have the necessary permissions to add information to the specified user or profile |
| 404 | The user identified by the federated_id or the profile identified by the ICCID cannot be found |
| 422 | Invalid request body |
| 500 | Internal Server Error |

Information on usage of "Send profile information":

This API should be used when information on a specific profile, or list of profiles, needs to be sent from MNO to the management server. For example, if one profile is not working due to a defect, the MNO can inform the management server to delete this specific profile. If the MNO needs to send information for several profiles, e.g., if two profiles have to be deleted, the MNO can specify several ICCIDs in an array, however all specified profiles must belong to the same user (same MNO token). The request "Send profile information" shall not be sent together with "Notify MNO token invalid", because in this case, the management server automatically considers all profiles which are linked to this MNO token as invalid and will delete these profiles.

The request "Send profile information" shall also not be sent, when the MNO sends an activation code to the management server with profileReplaced=true, because in this case, the management server automatically considers the profile which was specified in the management server's request in replaceIccid as invalid and will delete this profile.

Profile status information:

| | |
|---|---|
| invalid | Profile definitely in a state in which it cannot be used for voice or data and will never return to "valid" state →Profile deletion necessary. |
| suspended | Profile temporary in a state in which it cannot be used for voice or data. Profile might return to state "valid" →Considered as an information at the management server side |
| valid | Profile can be used normally again when it was in state "suspended" before. |

The profile status "invalid" shall only be sent from MNO to the management server, when the profile is in a state in which the customer cannot use telephony/data and the profile's state will NEVER return to a state in which the customer can use telephony/data via this profile again. When the management server receives an "invalid" status, the management server will delete the profile from the vehicle. Examples, when profile "invalid" can be sent from MNO to the management server are:

Profile has a technical defect and needs to be replaced with a new profile

Profile was removed from user's subscription and user will NEVER be able to use the profile in the future The profile state "suspended" & "valid" will trigger no direct action on the management server side, e.g., no profile deletion will be executed, but the information will be logged for support cases, e.g., when the customer calls the management server's customer care. The profile status "suspended" and "valid" shall NOT be sent during normal profile usage, e.g., when the profile gets enabled or disabled. These profile state shall only be sent, when the MNO blocks the usage of the profile for a limited time. Block usage means, that the user will not be able to use telephony/data after login at the vehicle because the MNO set the profile in a state which prohibits telephony/data services. Example use cases are:

Customer did not pay the MNO's bill and therefore, the MNO decides to block the telephony/data usage of the customer, until the bills get payed.

Customer loses main phone and calls MNO's customer care and MNO blocks the telephony/data usage of all profiles which are associated with the customer's contract for security reasons until the customer calls the MNO to release the usage blocker.

The management server will use the profile state "suspended" & "valid" in the following example support scenario: The customer calls the management server's customer care stating that some service in the vehicle which is using Consumer eSIM is not working. the management server will then check, if a profile status "suspended" was sent from MNO to the management server. If yes, the management server can explain to the customer, that the service is not working because the profile is currently in a state in which telephony/data cannot be used.

Error Handling

ERROR Codes Provided by the Management Server:

In case an error occurs (status code not 2xx), when the MNO uses one of these APIs:

Send MNO token
Send activation code
Notify MNO token invalid
Send profile information The management server will use one of the HTTP status error codes which are described at the response of each API (e.g., 401, 404, etc.). Additionally, in error case, the HTTP response body will contain following fields:

| Name | Description | Schema | Required | Example |
|---|---|---|---|---|
| code | Error code (see table below) | String | Only in case of error | 10 |
| error | Error description (see table below) | String | Only in case of error | The Account ID was not found |

Following error codes and descriptions can occur:

| Error code | Description | Actions | Information |
|---|---|---|---|
| 401 | Unauthorized | | |
| 403 | The client does not have the necessary permissions | | |
| 10 | The Account ID was not found | New onboarding process necessary if error cannot be resolved. | |

-continued

| Error code | Description | Actions | Information |
|---|---|---|---|
| 11 | The Account ID was found but is no longer valid | New onboarding process necessary if error cannot be resolved. | |
| 12 | The account ID has an invalid signature | New onboarding process necessary if error cannot be resolved. | |
| 13 | The secret knowledge provided in the account ID is invalid | New onboarding process necessary if error cannot be resolved. | |
| 19 | Other Account ID error | New onboarding process necessary if error cannot be resolved. | |
| 20 | The Federated_id was not found | Check if Federated_id was successfully added by the management server (request did not get error response) New onboarding process necessary if error cannot be resolved. | |
| 21 | The Federated_id was found but is no longer valid | Check if a request from the management server to invalidate Federated_id was sent | |
| 22 | The Federated_id has an incompatible format | New onboarding process necessary if error cannot be resolved. | Currently, no Federated_id format limitations. |
| 23 | The Federated_id is already assigned to a user | Repeat request with different Federated_id | |
| 29 | Other Federated_id error | New onboarding process necessary if error cannot be resolved. | |
| 30 | The specified Request ID was not found | | |
| 31 | The specified Request ID was found but is no longer valid | | |
| 39 | Other Request ID error | | |
| 40 | No SM-DP+ address found in activation code | Repeat request with modified content | |
| 41 | SM-DP+ address has an unsupported format | Repeat request with modified content | (E.g., no top-level-domain or domain. Example for address without TLD which triggers error: "mnoserver") |
| 42 | No AC_Token (MatchingID) found in activation code | Repeat request with modified content | |
| 43 | AC_Token (MatchingID) has an unsupported format | Repeat request with modified content | Currently, there are no restrictions in format of AC_Token (MatchingID) |
| 44 | Other format error of activation code | Repeat request with modified content | |
| 45 | Activation code contains confirmation code flag 'true' (Profile download process with confirmation code is currently not supported) | Repeat request with modified content | |
| 49 | Other activation code error | Repeat request with modified content | |
| 50 | Profile type unknown | Repeat request with modified content | |
| 51 | The specified profile type is unsupported for this request | Repeat request with modified content | |
| 59 | Other profile type error | Repeat request with modified content | |

Error Codes Provided by MNO:

The following errors can be provided to the management server in "Send MNO token" and "Send activation code" by MNO (if the specific error is applicable to MNO). The "error" field in these requests shall contain the error code as defined followed by ":" followed by the error description.

Example: "20: The Federated_Id was not Found"

| Error code | Description | Actions | Information |
|---|---|---|---|
| 10 | The Account ID was not found | | |
| 11 | The Account ID was found but is no longer valid | | |
| 12 | The account ID has an invalid signature | | |
| 13 | The secret knowledge provided in the account ID is invalid | | |
| 19 | Other Account ID error | | |
| 20 | The Federated_id was not found | | |
| 21 | The Federated_id was found but is no longer valid | | |
| 29 | Other Federated_id error | | |
| 30 | The specified Request ID was not found | | |
| 31 | The specified Request ID was found but is no longer valid | | |
| 39 | Other Request ID error | | |
| 50 | Profile type unknown | | |
| 51 | The specified profile type is unsupported for this request | | |
| 59 | Other profile type error | | |
| 4 digits number (e.g., 1000) | Additional MNO error messages. Examples: 1000: Customer not eligible 2000: Invalid customer type Additional MNO error messages must be specified and agreed before usage. | This error codes will be logged for support purposes (e.g., in case customer contacts customer care). The request will be marked as failed on the management server side. E.g., if a "Send MNO token" message from MNO contains error "1000: Customer not eligible", the onboarding process will be considered as failed on the management server side → New onboarding needs to be started. If "Send activation code" contains an error and no activation code, the management server will mark the request as failed. If the error is only temporary on MNO side (e.g., temporary outage), the MNO shall send "Send activation code" again with an activation code and without an error using the same activationCode-RequestID. | |

1.2 MNO Interfaces

The following defines the REST interfaces which must be provided by the MNOs.

Request Activation Code
POST/activation-code-requests/{federated_id}

The management server calls this interface to make an activation code request on a user's behalf.

Request
HTTP Headers:

| Name | Description | Schema | Required | Example |
|---|---|---|---|---|
| the management server-request-id | UUID identifying a request. | String, ([A-Za-z0-9]) | Yes | 14abcle2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by MNO to authenticate the management server. | String, ([A-Za-z0-9]) | Yes | 1234abcdefghij0123456789 |

Path Parameters:

| Name | Description | Schema | Required | Example |
| --- | --- | --- | --- | --- |
| federated_id | Federated ID generated by the MNO to be used by both the MNO and the management server to refer to the user. Referred to as MNO token in this document. | uuid | Yes | 14abcle2-338f-11e6-ac61-9e71128cae77 |

Request Body:

| Name | Description | Schema | Required | Example |
| --- | --- | --- | --- | --- |
| profileType | The type of the profile. Currently, there is only the profile type "personal" | String ("personal") | Yes | personal |
| deviceType | A type identifier for the eSIM device in the vehicle. | String ("bmw") | Yes | bmw |
| imei | International Mobile Equipment Identity. This parameter will be empty but present for compatibility reasons. | String, ([0-9]{2}-[0-9]{6}-[0-9]{6}-[0-9]{2}), or emtpy String | No | |
| eid | Embedded Integrated Circuit Card ID. This parameter will be empty but present for compatibility reasons. | String, ([A-Za-z0-9]), or emtpy String | No | |
| activationCodeRequestID | A UUID identifying the request for a new activation code. | uuid | Yes | 14abcle2-338f-11e6-ac61-9e71128cae77 |
| replaceIccid | Integrated Circuit Card ID, unique profile identifier. The profile which belongs to this iccid is the replace candidate, when all eSIM profile slots of the customers are already used. | 20-22 digits | No | 98341201501601380129 |

Response:
HTTP Status Code:

| HTTP-Code | Description |
| --- | --- |
| 200 | Success. Activation code is included in response body. |
| 201 | The request has been stored and will be processed. |
| 401 | Unauthorized |
| 404 | The user identified by the federated_id or the request could not be found. |
| 422 | No activation code can be created |
| 500 | Internal Server Error |

Response Body (Optional):

| Name | Description | Schema | Required | Example |
| --- | --- | --- | --- | --- |
| activationCode | The activation code which is used to download an eSIM profile from the SM-DP+ server | String | Yes, if status code is 200 | q/XJojvcQksFdUUbk9sqiD J9 + KR0etRSPnVt4Bn TQ4/9jG0UvX + epLLCfrO07Dwn |
| profileType | The type of the profile. Currently, there is only the profile type "personal" | String ("personal") | Yes, if status code is 200 | personal |

-continued

| Name | Description | Schema | Required | Example |
|---|---|---|---|---|
| profileReplaced | Indicates if the profile which was specified by MNO deleted the the management server from an eSIM slot of the customer in order to create the new requested profile. true: Means that the MNO replaced the profile which was specified by the management server with the new profile to which the new requested activation code belongs. false: The iccid which was sent from the management server was ignored and a new activation code was created without removing an existing profile. | String ("true"\|"false") | Yes, if the management server sends a "replaceIccid" in Request activation code request body. Oherwise: No | true |

Activation Code Encryption:

For security reasons, the activation code must not be sent as plain text in the field "activationCode", but must be encrypted. This is additional to the TLS encryption of the message itself, meaning, the message must be encrypted using TLS and additionally, the activation code must be encrypted in the field "activationCode".

Details on Encryption:

The activation codes shall be encrypted end to end between MNO and the vehicle to protect the user. The activation code will be encrypted in MNO backend and decrypted in the vehicle. The details about the type of encryption and algorithm will be included in the interface contract.

Generic Example

The activation code
  1$CV-1000-MY-
    ESIM.COM$DEF40A57E6CEFD34FA64B4A38D9681A5
    after encryption and Base64 encoding is:
K+gntTX91B40088    Km+fraIYJHoPXK9yOAtJWebk+
VGq+ShFHBEx+BUeWC2CzWPox
ba806OF1kNZvTcaylhYORA==

This encrypted activation code must then be sent in the field "activationCode".

When the management server uses "Request activation code", the MNO has two options on how to respond:
  Synchronous response mode:
    Successful response (activation code generated/available):
      The MNO uses status code 200 in "Request activation code" response and includes the activation code and profile type in the response body as described above.
    Unsuccessful response (activation code cannot be generated):
      The MNO uses a 4xx status code and includes an error description in response body (as described in error handling).
    The synchronous response mode is only allowed, if the activation code is already available at the MNO's system and can be returned within 3 seconds. This means especially, that no more user interaction is necessary. If any user interaction is necessary, the asynchronous response mode must be used.
  Asynchronous response mode:
    Successful response:
      The MNO uses status code 201 indicating that the management server's request will be processed. When the activation code is available, the MNO uses the management server's API "Send activation code" to deliver the activation code to the management server.
    Unsuccessful response:
      The MNO uses status code 201 indicating that the management server's request will be processed. If an error occurs during processing, the MNO uses the management server's API "Send activation code" to deliver the error description to the management server.

Send CSIM Status

POST/statuses/{federated_id}

This interface is called by the management server to notify the MNOs of eSIM profile status updates. In addition to the notifications set in the GSMA standard, a backend-to-backend profile notification is also sent to MNOs.

Request
HTTP Headers:

| Name | Description | Schema | Required | Example |
|---|---|---|---|---|
| the management server-request-id | UUID identifying a request. | String, ([A-Za-z0-9]) | Yes | 14abc1e2-338f-11e6-ac61-9e71128cae77 |
| X-correlation-id | UUID identifying a transaction | String, ([A-Za- z0-9]) | Yes | 31715660-01ac-4411-8f15-6f7ad4c269be |
| x-api-key | Used by MNO to authenticate the management server. | String, z0-9]) ([A-Za- | Yes | 1234abcdefghij0123456789 |

Path Parameters:

| Name | Description | Schema | Required | Example |
|---|---|---|---|---|
| federated_id | Federated ID generated by the MNO to be used by both the MNO and the management server to refer to the user. Referred to as MNO token in this document. | uuid | Yes | 14abc1e2-338f-11e6-ac61-9e71128cae77 |

Request Body:
A List Containing One or Multiple of the Following Objects:

| Name | Description | Schema | Required | Example |
|---|---|---|---|---|
| eid | Embedded Integrated Circuit Card ID | String, ([A-Za-z0-9]) | Yes | 89049032000001000000000831934057 |
| iccid | Integrated Circuit Card ID, unique profile identifier. | 20-22 digits | Yes | 98341201501601380129 |
| status | A string describing the new status of the profile. | String, ("deleted"\|"enabled"\|"disabled"\|"installed"\|"installation failed") | Yes | "deleted" |

Response:
HTTP Status Code:

| HTTP-Code | Description |
|---|---|
| 201 | The request has been stored and will be processed. |
| 401 | Unauthorized |
| 404 | The user identified by the federated_id or the request could not be found. |
| 422 | The request cannot be processed. |
| 500 | Internal Server Error |

Status Subscription Option

The list of possible status values is described in the table above in "status" "Schema". The MNO can decide which of the possible CSIM state shall be sent from the management server to the MNO or shall NOT be sent. E.g., The MNO could decide that the management server shall send no "enabled" and no "installed" status, but shall send e.g., "deleted". The MNO must inform the management server which status shall be sent and the MNO's decision will be documented in the interface contract after the management server's agreement. If the MNO does not specify anything, the management server will send only the "deleted" status to the MNO and all other status updates will not be sent to the MNO.

The deletion message can be used by the MNO to free up an eSIM slot for the customer when receiving this information from the management server. All other status information (including "enabled" and "disabled") are intended only for support cases and must not be used to trigger any provisioning or changes of the customer's connectivity configuration.

The "enable" and "disable" status are only sent once, for the first profile enablement or disablement. All following enablements and disablements will not be sent.

Figure 5:
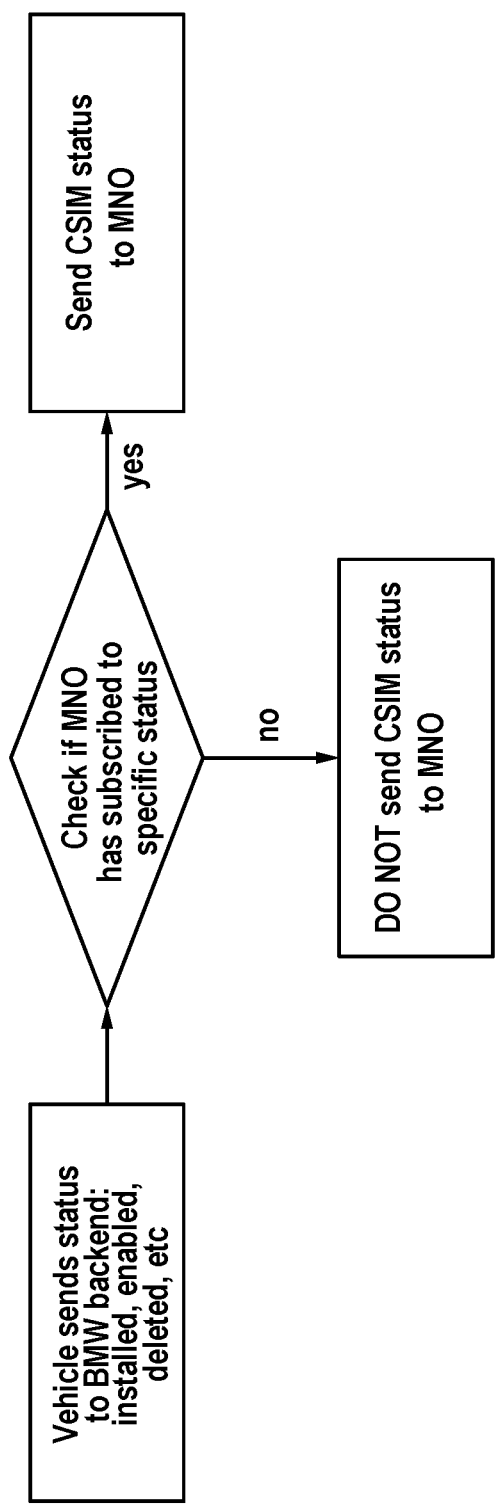
FIG. 5 shows a logic implemented at the management server according to the present subject matter.

The logic is implemented at the management server is shown in FIG. 5.

Request Invalidate MNO Token

DELETE/users/{federated_id}

This interface is called by the management server to request the invalidation of a federated id, called an MNO token in this document. This call happens after the user chooses to cancel the link between the management server account and MNO account. The MNO token cannot be used to request any new activation codes any longer and all profiles of the user will be deleted as a consequence.

Request
HTTP Headers:

| Name | Description | Schema | Required | Example |
|---|---|---|---|---|
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |

-continued

| Name | Description | Schema | Required | Example |
|---|---|---|---|---|
| x-api-key | Used by MNO to authenticate the management server. | String, ([A-Za-z0-9]) | Yes | 1234abcdefghij0123456789 |

Path Parameters:

| Name | Description | Schema | Required | Example |
|---|---|---|---|---|
| federated_id | Federated ID generated by the MNO to be used by both the MNO and the management server to refer to the user. Referred to as MNO token in this document. | uuid | Yes | 14abc1e2-338f-11e6-ac61-9e71128cae77 |

Response
HTTP Status Code:

| HTTP-Code | Description |
|---|---|
| 204 | The MNO token has been invalidated successfully. |
| 401 | Unauthorized |
| 404 | User cannot be found |
| 422 | The request cannot be processed. |
| 500 | Internal Server Error |

Service Health Check
GET/Healthcheck

This interface is called by the management server to get the status of the MNO's service, which processes the management server's requests and sends out the requests to the management server. A status code of 200 will be interpreted as "service operates normally". All other status codes will be interpreted as service operates not normally. The health check endpoint shall have the same authentication and authorization requirements as all other APIs provided by the MNO (e.g., firewall rules, client and server certificates for mutual authentication, API key or basic authentication).
Request
HTTP Headers:

| Name | Description | Schema | Required | Example |
|---|---|---|---|---|
| the management server-request-id | UUID identifying a request. | String, ([A-Za-z0-9]) | Yes | 14abc1e2-338f-11e6-ac61-9e71128cae77 |
| x-correlation-id | UUID identifying a transaction | String, ([A-Za-z0-9]) | Yes | 31715660-01ac-4411-8f15-6f7ad4c269be |
| x-api-key | Used by MNO to authenticate the management server. | String, ([A-Za-z0-9]) | Yes | 1234abcdefghij0123456789 |

Response:
HTTP Status Code:

| HTTP-Code | Description |
|---|---|
| 200 | The service operates normally |
| 401 | Unauthorized |
| 403 | Forbidden |

-continued

| HTTP-Code | Description |
|---|---|
| 422 | The request cannot be processed. |
| 500 | Internal Server Error |

Error Handling

In case an error occurs during the call of one of these APIs (status code not 2xx)

Request activation code

Send CSIM status

Request invalidate MNO token the MNO must add in the HTTP response body following fields:

| Name | Description | Schema | Required | Example |
|---|---|---|---|---|
| code | Error code (see table below) | String | Only in case of error | 10 |
| error | Error description (see table below) | String | Only in case of error | The Account ID was not found Maximum length is 512 characters. |

The values which are predefined for the error codes and description can be found in chapter 4.1 the management server CESIM MNO API V1, section "Error handling" sub-section "Error codes provided by MNO". This includes also the possibility, that the MNO provides additional error codes and descriptions as described in the referenced sub-section. All additional error codes must be specified and agreed before being used. the management server will log these errors/descriptions for support cases (e.g., customer contacts customer care) and will mark the request as failed.

For following API, special rules apply:
Request activation code

The management server uses this API to request an activation code. As described in chapter 4.1 the management server CESIM MNO API V1, there are two corresponding APIs provided from the management server, which the MNO uses to send the token or activation code to the management server (see APIs "Send activation code" and "Send MNO token" in chapter 4.1). The APIs "Send activation code" and "Send MNO token" also contain a field, in which an error message can be transferred to the management server.

Therefore, for "Request activation code" and, following error handling strategies are allowed:

If an error occurs during the management server's request "Request activation code", the MNO can respond to this request with a 4xx or 5xx error code (See HTTP status codes in the section of these APIs) and with an error response body (see above). the management server will then know, that the request failed.

The MNO can respond to the request "Request activation code" with HTTP status code 201 (See HTTP status codes in the section of these APIs). the management server will then know, that the request is currently being processed at the MNO. If an error happens then later during the process (e.g., customer does not finish onboarding at MNO touchpoint successfully), the MNO can use APIs "Send activation code" and "Send MNO token" and include the error information in these APIs (see description of these APIs). If these APIs are used with an error code and description, the management server will know that the initial request failed.

1.3 General API Requirements

The following requirements apply to both chapters CESIM MNO API V1 and MNO Interfaces.

Ensuring highest security and data privacy for the service is number one priority for the management server. If the management server or the MNO becomes aware of any security or data privacy related issues, both parties agree to inform each other immediately about these issues and both parties agree to work on resolving the issues with highest priority.

Following content type has to be used for the APIs: application/json

An API key shall be used for each request to "the management server CESIM MNO API V1". For "the management server CESIM MNO API V1", the management server will provide the API key to the MNO. For "MNO Interfaces", the MNO provides a username and password to the management server for basic authentication or provides an API key. The MNO must specify if an API key or basic authentication shall be used for "MNO Interfaces". The MNO provides the username and password or API key to the management server.

Two way TLS (mutual authentication) shall be used for each request.

For the management server CESIM MNO API V1 (MNO calls APIs provided at the management server), the following procedure will be used:

the management server provides the server certificate, which must be trusted by the MNO The MNO provides the client certificate to the management server, so the management server can add the MNO's client certificate to the management server list of trusted clients For MNO Interfaces (the management server calls APIs provided at MNO), the following procedure will be used:

The MNO provides the server certificate, which must be trusted by the management server the management server provides the client certificate to the MNO, so the MNO can add the management server's client certificate to the MNO's list of trusted clients.

The certificates provided by the management server and MNO should apply to the following criteria if not stated otherwise in the interface contract:

Cryptographic Protocol: TLS v1.2

Key strength: 2048 bit

Certificate expiry: 1 year

All certificates (server & client certificates) must be signed from a public certificate authority. Self-signed certificates are only allowed if agreed in the interface contract. If not agreed otherwise in the interface contract, the certificate chain consists of a root certificate, an intermediate certificate and a leaf certificate.

Changes of root and intermediate certificates must be announced at least six weeks before the actual change date by the MNO or by the management server (depending on which side changes the certificate).

All communication between the management server backend and MNO backend, and all communication between touchpoints and backends (e.g., from MNO touchpoint to MNO backend), and all other communication related to the the management server consumer eSIM service must be encrypted. Use of unencrypted communication is strictly forbidden.

The MNO ensures, that all data in the MNO's systems related to the the management server consumer eSIM service is always encrypted at transit and at rest (e.g., data base).

The MNO and the management server will provide the IP addresses which are used for outgoing calls (form MNO to the management server or from the management server to MNO) so that these IP addresses can be added to firewall white lists.

the management server and the MNO will provide a pre-production environment and a production environment of the service. The pre-production environment must always be available and must have the same functionality and behavior as the production environment. Access to the management server production environment can only be granted after successful testing on pre-production. This applies for the initial setup of the service and for any later update.

the management server and the MNO will provide the service endpoint URLs for the pre-production and production environment. A later change of the pre-production or production URL must be announced at least six weeks before the planned change date.

For the UUIDs (Universally unique identifier) which are used in the described interfaces, following applies unless otherwise stated: There is no special requirement on how UUIDs are generated as long as the UUIDs are random and unique. Following examples show the valid format of the UUIDs to be used:

62d198e4-36ea-46c5-aaed-06727a272c72
da62eb89-6255-486c-85c9-d5a7369060b0
0297e8f3-e2fd-404d-9dc9-e76f6c8c1d52.

For security reasons, the account ID and the MNO token of a user must not be the same value.

MNO tokens, which are no longer valid must be invalidated using a token invalidate request as described in the interface description. If the user or the management server invalidates the token at the management server side, the management server will notify the MNO that the token is invalid. If the user or the MNO invalidates the token at MNO side, the MNO will notify the management server that the token is invalid.

Information on how to use request ID and correlation ID:

| | |
|---|---|
| the management server-request-id | The request ID is an UUID which is set randomly and unique for each request. The request ID is different even for retries so that each API request is uniquely identified for with the request Id. |
| x-correlation-id | The correlation ID is also an UUID but does not identify a single request, but a coherent set of requests which form a transaction. In following cases, the transaction ID must be the same for different requests: Retries in error cases When the MNO sends the MNO token to the management server via the API "Send MNO token", the MNO must set the correlation ID to the session ID ("sid") from the anonymous account ID JWT. Asynchronous answer requests: When the management server sends "Request activation code" and the MNO uses the asynchronous answer "Send activation code", then the correlation ID in "send activation code" must be the same as in the management server's initial request "Request activation code" |

EXAMPLES

| Example Nr. | Request | the management server-request-id | x-correlation-id |
|---|---|---|---|
| 1 | the management server sends CSIM status for vehicle A | 025c94ad-9dea-49a5-9c86-084ec19a1cb7 | 083be142-222f-4172-b865-838baa2e3c50 |
| 2 | the management server sends CSIM status for vehicle B | 92047e52-fffb-4f96-bfaa-7b41244595ab | 4e6b67ae-02ff-4d08-9f4c-7685c4aede7e |
| 3 | the management server sends CSIM status for vehicle B - Retry due to API error | 055de2f4-7b91-448b-984b-8af95170c710 | 4e6b67ae-02ff-4d08-9f4c-7685c4aede7e |
| 4 | the management server makes redirect from the management server touchpoint to MNO touchpoint using following payload: { "exp": "1580724000", "ver": "789", "sid": "a625211a-2cba-4136-aa8b-34c390b8a7d7", "iat": 1580720400 | | |
| 5 | MNO sends token to the management server after the redirect from example 4. | e2903c83-554b-48bb-a396-8640d9c5dd7f | a625211a-2cba-4136-aa8b-34c390b8a7d7 |
| 6 | the management server sends request activation code | cbf1cabf-8458-4596-be97-a492e7eecf6f | 1e0e0e2e-b192-414f-80a2-8f6c2564137c |
| 7 | MNO sends Send activation code for the request of example 6. | 2548914c-9e8b-4b5c-9c55-f90c9de075e9 | 1e0e0e2e-b192-414f-80a2-8f6c2564137c |

The following table shows the maximum length of the values which are sent from the management server to MNO or vice versa via the described interface. This ensures that the management server and the MNO use appropriate field lengths in their data bases for each of the following values:

| Value | Maximum length (characters unless otherwise stated) |
|---|---|
| All UUIDs (e.g., the management server-request-id, federated_id) | 36 (as per definition of UUID format) |
| API keys as in x-api-key and generally Authorization header values (e.g., header value if basic auth is used) | 256 |
| Anonymous account ID (account_ID) | 512 |
| phoneNumber | 64 (for plain text format, unencrypted) (See also Remark 1) |
| subscriptionType, profileType, deviceType | 32 |
| isUpdate, profileReplaced | Only following values are allowed as described in interface specification: String ("true"\|"false") |
| error | 512 |
| activationCode | 255 (for plain text format, unencrypted) (See also Remark 1) (See also Remark 2) |
| source | 64 |
| eid | 64 (See also Remark 1) |
| imei | 64 (See also Remark 1) |
| iccid | 64 (See also Remark 1) |
| status (in CSIM status) | 64 |
| reason | 256 |
| X-rgw-applicationid | 128 |
| customerGroup | 64 |

Remark 1: This corresponds to the maximum length which the management server can store for this value. If the MNO uses a shorter length in their system, this is acceptable because the management server only uses the values which were provided by the MNO.
Remark 2: As defined in SGP.22 eSIM Technical Specification SGP.22 V2.2.1

For security reasons, the account_id (anonymous account ID), which is generated by the management server before the redirect from the management server to MNO touchpoint, has a limited temporal validity. If an MNO token is sent from MNO to the management server using an expired account_id, the MNO token will be rejected by the management server. The validity time of the account_ids is specified in the interface contract between the management server and MNO.

A signed interface contract is mandatory to access to the the management server's Consumer eSIM service APIs.

Operation of the interfaces must be done on a 24/7 basis with agreed SLAs, including incident management and problem management.

If not stated otherwise in the interface contract, English is used for communication, including communication in incident management.

All processes for operations and support, including incident management, problem management, change management, contact persons and communication channels must be clarified before access to production environment is granted.

Planned down times of the service for maintenance must be performed during non-business hours and must me announced at least 48 hours in advance (except for emergency changes).

the management server and the MNO are responsible for testing and quality assurance of their own systems. Before initial service launch, the management server and the MNO must perform sufficient testing of their own systems and each adaption or new feature after initial service launch must also be sufficiently tested to ensure high quality of the service. After testing of own systems, joined testing, e.g., integration testing, will be performed. To allow continues testing before and after service launch, the pre-production environments of the service must be available all times with the same SLAs and behavior of the production environment.

In case of security issues or in case of cumulated or repeated customer problems, the management server may limit the usage of the Consumer eSIM APIs in order to avoid the issues or to avoid customer problems.

In case of problems with the service, which may be discovered before or after service launch, the management server and the MNO agree to work jointly on solving the issues.

MNO custom header option

The MNO can optionally specify one customer header (header name and header value), which the management server will include in each request, which the management server sends to the MNO (e.g., in Request activation code, Send CSIM status, etc.). The header name and the header value must be static and the same for all of the requests. Also, this custom header cannot be used to include any additional customer or vehicle specific information.

An intended use case for this custom header is for example that the management server sends a client ID to the MNO in each request, which was defined by the MNO, example: header name: "client_id", header value: "bmw123", so the MNO can identify that the request originates from the management server.

Per default, no custom header will be sent. If the MNO needs the custom header, the MNO must inform the management server, then, the management server will check if the requested custom header name and header value are possible and then, if the management server approves, the custom header name and header value will be documented in the interface contract.

2. Edge Case Considerations

Vehicle User Login

Normal use case: The customer must perform a personalized login at the vehicle to be able to use the Consumer eSIM profile. The customer can physically only be in one vehicle, meaning that only one of the Consumer eSIM profiles is enabled.

Edge case: The customer can start two vehicles, leave both vehicles running and login at both vehicles or share his/her the management server login credentials with another person. This means, that the customer is then logged in at two vehicles with two eSIM profiles enabled.

Expected behavior: In this edge case, the MNO shall tolerate, that two Consumer eSIM profiles can be enabled at the same time.

The invention claimed is:

1. A method of providing a communication function in a user equipment (UE), comprising:
   receiving, at a management server, a first request from the UE to implement a communication profile of a user in the UE;
   receiving, at a mobile network operator (MNO), a second request from the management server requesting an activation of the communication profile based on the first request;
   receiving, at the management server from the MNO, an activation code based on the second request; and
   forwarding the received activation code from the management server to the UE, wherein the activation code enables an implementation of the communication profile in the UE.

2. The method of claim 1, further comprising:
   receiving, at the UE, an initiation message from the user, wherein the first request is based on the initiation message.

3. The method of claim 2, wherein the initiation message includes at least one of an MNO selection and/or a phone number of the user.

4. The method of claim 2, wherein the initiation message is sent by the user to the UE, or by the user to the management server.

5. The method of claim 4, wherein the initiation message is sent by another UE of the user to the UE or the management server.

6. The method of claim 1, further comprising:
   sending, from the management server to the MNO, a third request requesting a token from the MNO; and
   receiving, at the management server from the MNO, a token message from the MNO.

7. The method of claim 1, further comprising:
   generating, at the MNO, a SIM profile for the user.

8. A non-transitory computer readable storage medium comprising instructions which, when executed on one or more processors, cause the one or more processors to perform the method of claim 1.

9. A management server, comprising one or more processors configured to:
   receive a first request from a user equipment (UE) to implement a communication profile of the UE;
   send to a mobile network operator (MNO) a second request requesting an activation of the communication profile based on the first request;
   receive from the MNO an activation code based on the second request; and
   forward the received activation code to the UE, wherein the activation code enables an implementation of the communication profile in the UE.

* * * * *